United States Patent [19]

Psaar

[11] 3,972,879

[45] Aug. 3, 1976

[54] PROCESS FOR ISOLATING EASILY SOLUBLE BASIC OXAZINE DYESTUFFS AND PHENAZINE DYESTUFFS

[75] Inventor: Hubertus Psaar, Leverkusen, Germany

[73] Assignee: Bayer Aktiengesellschaft, Leverkusen, Germany

[22] Filed: Oct. 17, 1974

[21] Appl. No.: 515,469

[30] Foreign Application Priority Data
Oct. 27, 1973   Germany............................. 2353987

[52] U.S. Cl............................. 260/244 R; 260/267
[51] Int. Cl.$^2$............... C07D 265/38; C07D 273/00; C07D 295/00; C07D 241/46
[58] Field of Search............................ 260/244, 267

[56]   References Cited
UNITED STATES PATENTS

| | | | |
|---|---|---|---|
| 3,655,601 | 4/1972 | Ottawa et al. ..................... | 260/244 |
| 3,681,347 | 8/1972 | Herz et al. .......................... | 260/244 |
| 3,731,222 | 5/1973 | Drexhage........................... | 260/244 |
| 3,806,504 | 4/1974 | Mundlos et al. .................... | 260/244 |

FOREIGN PATENTS OR APPLICATIONS
532,301   10/1956   Canada

OTHER PUBLICATIONS

"Effect of Urea on the Aqueous Solubility of Dispersed Dyes", Katayama et al., –*Kolloid–Z* 202(2), pp. 157–161–(1965).

*Primary Examiner*—Sam Rosen
*Assistant Examiner*—D. W. Robinson
*Attorney, Agent, or Firm*—Plumley and Tyner

[57]   ABSTRACT

Basic oxazine and phenazine dyestuffs are isolated from their solutions by adding urea or thiourea.

6 Claims, No Drawings

PROCESS FOR ISOLATING EASILY SOLUBLE BASIC OXAZINE DYESTUFFS AND PHENAZINE DYESTUFFS

In the production of basic oxazine dyestuffs and phenazine dyestuffs, the isolation of the compounds frequently presents great difficulties since many of these dyestuffs are extremely easily soluble in water or polar organic solvents, the media preferred for their preparation. The addition of the customary agents used for salting out basic dyestuffs, such as sodium chloride and sodium sulphate, to the reaction solutions, has no effect. Hence, these soluble oxazine dyestuffs and phenazine dyestuffs have been precipitated as zinc double salts or trichlorozincate salts from their solutions. However, this form of isolation has considerable disadvantages. Thus, for example, the production of liquid preparations of these dyestuffs in water or polar organic solvents presents great difficulties because of the zinc double salts being sparingly soluble in these media, and is only possible by using special solvents or removing the zinc. Furthermore, the zinc salts in the effluent represent a considerable contamination of the environment.

It has now been found, surprisingly, that easily soluble basic oxazine dyestuffs and phenazine dyestuffs can be precipitated in high yields from their solutions by adding urea or thiourea to these solutions.

The invention therefore relates to a process for isolating basic oxazine dyestuffs and phenazine dyestuffs; the process is characterised in that the dyestuffs are precipitated from the solutions in which they are present, by addition or urea or thiourea.

The process according to the invention has proved particularly valuable when isolating basic oxazine dyestuffs and phenazine dyestuffs of the formula

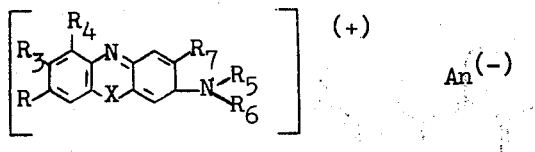

in which
R denotes lhydrogen or, preferably, the $-NR_1R_2$ group, in which
$R_1$ and $R_2$ independently of one another represent hydrogen or an alkyl, alkenyl or phenyl group;
$R_3$ denotes hydrogen, the methyl group or an alkoxy group;
$R_4$ preferably represents hydrogen or together with $R_3$ forms an aromatic radical;
$R_5$ and $R_6$ independently of one another denote hydrogen or an alkyl or alkenyl group;
$R_7$ denotes hydrogen, the methyl group or an alkoxy group,
X preferably denotes oxygen or the $<N-R_8$ group in which
$R_8$ represents hydrogen or an alkyl or alkenyl group or a phenyl group and
$An^{(-)}$ denotes an anion, preferably a chloride ion.

The following may be mentioned as examples of $R_1$, $R_2$, $R_5$, $R_6$ and $R_8$: as alkyl groups, $C_1$-$C_4$-alkyl groups, such as the methyl, ethyl, n- and i-propyl and n-, i- and t-butyl group; as alkenyl groups, $C_2$-$C_3$-alkenyl groups, such as the vinyl, allyl and propen-(1)-yl radical.

Possible alkoxy groups $R_3$ and $R_7$ are above all $C_1$-$C_4$-alkoxy groups, such as the methoxy or ethoxy group.

Fused benzene and naphthalene rings should above all be mentioned as aromatic radicals which can be formed by $R_3$ and $R_4$ together.

The phenyl groups and benzene or naphthalene rings can, in turn, be substituted by non-ionic groups and/or carboxyl groups.

Non-ionic substituents in the sense of the invention are the non-dissociating substituents customary in dyestuff chemistry, such as halogen, alkyl, cycloalkyl, hydroxyl, alkoxy, aralkoxy, cycloalkoxy, aryloxy, acyloxy, acylalkoxycarbonyl, aminocarbonyl, nitrile, amino, alkylamino, dialkylamino, acylamino, aminosulphonyl, mercapto, alkylmercapto and arylmercapto groups.

Halogen preferably stands for fluoro, chloro or bromo, alkyl preferably contains 1 – 6 C-atoms, cycloalkyl preferably means cyclohexyl or cyclopentyl, aryl preferably means phenyl or naphthyl, arylalkyl preferably means benzyl or β-phenylethyl and acyl preferably means $C_1$-$C_4$-alkylcarbonyl or -sulphonyl or phenylcarbonyl or -sulfphonyl.

The process according to the invention can be carried out by adding urea or thiourea to the reaction solutions — which preferably are still warm — which contain the dyestuffs, after completion of the condensation reaction, and then continuing to stir the reaction mixture for a certain time, which depends on the ability of the dyestuff to crystallise and can be between 10 minutes and 15 hours, at temperatures of 0° to about 20°C.

The urea or thiourea is used in an amount such that there is at least 1 mol of urea or thiourea per 1 mol of dyestuff; preferably 3–15 mols of urea or thiourea are employed per 1 mol of dyestuff.

The solvents used when preparing the basic oxazine dyestuffs and phenazine dyestuffs are above all polar organic solvents, such as alcohols, for example methanol, ethanol, propanols or butanols, ketones, for example methyl ethyl ketone, and also dimethylformamide, dimethylacetamide, acetonitrile or sulpholane. These reaction media can contain up to about 30% by weight of water, based on the solvent.

Using the process according to the invention it proves possible to separate off the basic oxazine dyestuffs and phenazine dyestuffs not only in high yields but also in high purity.

Stable concentrated solutions containing at least 10% by weight of dyestuff can be prepared from the dyestuff salts, isolated according to the invention, by addition of water. These concentrated solutions, which are miscible with water in all proportions, permit simplified use of the dyestuffs in the textile industry or paper industry.

Unless, otherwise stated, the parts mentioned in the examples which follow are parts by weight.

EXAMPLE 1

16.5 parts of 3-diethylaminophenol are dissolved in 90 parts of 96% strength ethanol and the solution is warmed to 70°C. 25.8 parts of 3-ethoxy-4-nitroso-phenyl-diethylammonium chloride are introduced into this solution over the course of 1 hour. After stirring for one hour at 70°C, 30 parts or urea are added to the solution, and the mixture is then stirred for 5 hours at 0° to 10°C. The dyestuff is filtered off, washed with 20 parts of 96% strength ethanol and dried in vacuo at 50°C.

EXAMPLE 2

A solution of 3-ethoxy-4-nitroso-phenyl-diethylammonium chloride in 90 parts of isopropanol is added, over the course of 2 hours, to a solution of 16.5 parts of 3-diethylaminophenol in 90 parts of isopropanol at 80°C. After stirring for 1 hour at 80°C, 25 parts of thiourea are added to the reaction solution and the mixture is stirred for 2 hours at 0° to 10°C. The dyestuff is worked up as described in Example 1.

EXAMPLE 3

24.5 parts of 3-methoxy-4-nitroso-phenyl-diethylammonium chloride and 12 parts of water are introduced over the course of one hour into a solution of 12.3 parts of 2-amino-4-hydroxytoluene in 185 parts of 99.5% strength ethanol, which has been warmed to 70°C. After warming the reaction mixture to 70°C for 1 hour, 45 parts of urea are added. The batch is then worked up as described in Example 1.

If instead of 12.3 parts of 2-amino-4-hydroxytoluene, the equivalent amount of 2-amino-4-cyanoethylaminotoluene was employed, the corresponding phenazine dyestuff was obtained.

The dyestuffs listed in the tables which follow were isolated by the same procedure.

Table 1

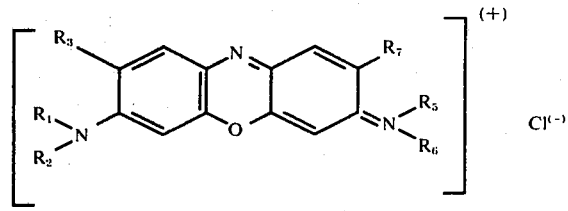

| Example No. | $R_1$ | $R_2$ | $R_3$ | $R_5$ | $R_6$ | $R_7$ |
|---|---|---|---|---|---|---|
| 4 | $CH_3$ | $CH_3$ | H | $CH_3$ | $CH_3$ | H |
| 5 | $C_2H_5$ | $C_2H_5$ | H | H | $C_2H_5$ | $CH_3$ |
| 6 | $C_2H_5$ | $C_2H_5$ | H | H | $C_2H_4CN$ | $CH_3$ |
| 7 | $C_2H_5$ | $C_2H_5$ | H | H | $C_2H_4CN$ | $OCH_3$ |
| 8 | $C_2H_5$ | $C_2H_5$ | H | $CH_3$ | $C_2H_4CN$ | H |
| 9 | $C_2H_5$ | $C_2H_5$ | H | $CH_3$ | $CH_3$ | $CH_3$ |
| 10 | $C_2H_5$ | $C_2H_5$ | H | H | $C_6H_5$ | H |
| 11 | $CH_3$ | $CH_3$ | $CH_3$ | $C_2H_5$ | $C_2H_4CN$ | H |
| 12 | $C_2H_5$ | H | $CH_3$ | $CH_3$ | $CH_3$ | $CH_3$ |
| 13 | $C_2H_5$ | H | $CH_3$ | H | H | $OCH_3$ |
| 14 | $C_6H_5$-o-$CH_3$ | H | H | H | $C_2H_4CN$ | $CH_3$ |
| 15 | $C_6H_5$ | H | $CH_3$ | H | $C_2H_5$ | $CH_3$ |

Table 2

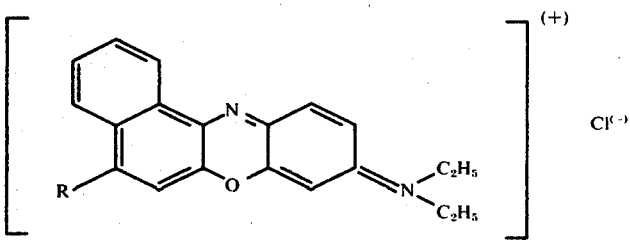

| Example No. | R |
|---|---|
| 16 | H |
| 17 | $NH_2$ |
| 18 | $N(C_2H_5)_2$ |

Table 3

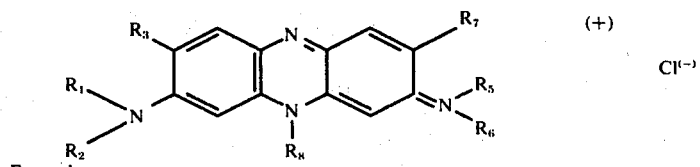

| Example No. | $R_1$ | $R_2$ | $R_3$ | $R_5$ | $R_6$ | $R_7$ | $R_8$ |
|---|---|---|---|---|---|---|---|
| 19 | $C_2H_5$ | $C_2H_5$ | H | H | H | $CH_3$ | H |
| 20 | $C_2H_5$ | $C_2H_5$ | H | H | H | $CH_3$ | $C_2H_5$ |
| 21 | $C_2H_5$ | $C_2H_5$ | H | H | H | $CH_3$ | $C_6H_5$ |
| 22 | $CH_3$ | $CH_3$ | $CH_3$ | H | H | $CH_3$ | $C_6H_5$ |
| 23 | $CH_3$ | $CH_3$ | H | H | $C_2H_5$ | $CH_3$ | $C_6H_5$ |

EXAMPLE 24

50 parts of the dyestuff prepared according to Example 1 are dissolved in 50 parts of water at room temperature. A stable, highly concentrated dyestuff solution is obtained.

I claim:

1. Process for isolating oxazine dyestuffs or phenazine dyestuffs from solutions by adding urea or thiourea to said solutions in an amount of at least 1 mol of urea or thiourea per 1 mol of dyestuff and sufficient to precipitate said dyestuffs; said dyestuffs having the formula

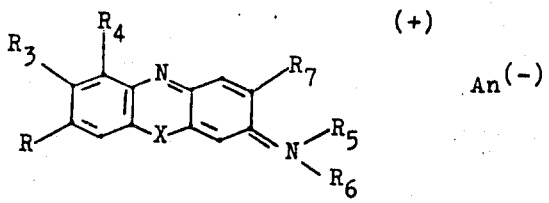

in which

R is hydrogen-$NR_1R_2$;

$R_1$ and $R_2$ independently of one another are hydrogen;

alkyl; alkenyl; phenyl; or phenyl substituted by a non-ionic substituent or carboxyl;

$R_3$ is hydrogen, methyl or alkoxy;

$R_4$ is hydrogen or together with $R_3$ forms an aromatic radical;

$R_5$ and $R_6$ independently of one another are hydrogen, alkyl or alkenyl;

$R_7$ is hydrogen, methyl or alkoxy;

X is oxygen or $<N-R_8$;

$R_8$ is hydrogen; alkyl; alkenyl; phenyl; or phenyl substituted by a non-ionic substituent or carboxyl;

$An^{(-)}$ is an anion.

2. The process of claim 1 in which said dyestuffs have the formula

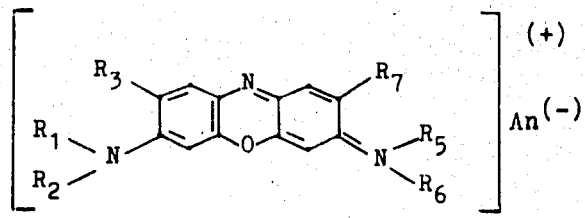

3. The process of claim 1 in which $An^{(-)}$ is $Cl^{(-)}$.

4. The process of claim 1 in which:

$R_1$ and $R_2$ independently of one another are hydrogen, $C_1$-$C_4$-alkyl, $C_2$-$C_3$-alkenyl or phenyl;

$R_3$ is hydrogen, methyl or $C_1$-$C_4$-alkoxy;

$R_4$ is hydrogen or together with $R_3$ forms a fused benzene or naphthalene radical;

$R_5$ and $R_6$ independently of one another are hydrogen, $C_1$-$C_4$-alkyl or $C_2$-$C_3$- alkenyl;

$R_7$ is hydrogen, methyl or $C_1$-$C_4$-alkoxy;

X is O or $<N-R_8$;

$R_8$ is hydrogen, $C_1$-$C_4$-alkyl, $C_2$-$C_3$-alkenyl or phenyl; and $An^{(-)}$ is an anion.

5. The process of claim 1 in which said dyestuff solution comprises said dyestuff and a polar organic solvent and up to 30% by weight of water based on the polar organic solvent.

6. The process of claim 1 in which X is O.

* * * * *